Feb. 27, 1968 C. J. N. CANDY 3,371,229

FREQUENCY TRANSLATOR

Filed Dec. 23, 1965

INVENTOR
C. J. N. CANDY
BY G. E. Kerney
ATTORNEY

3,371,229
FREQUENCY TRANSLATOR

Charles J. N. Candy, Convent Station, N.J., assignor to Bell Telephone Laboratories, Incorporated, New York, N.Y., a corporation of New York Filed Dec. 23, 1965, Ser. No. 515,927
6 Claims. (Cl. 307—271)

ABSTRACT OF THE DISCLOSURE

Due to component unbalance, unwanted harmonics are usually present in the output waveform of a frequency converter. Unwanted harmonic content may be significantly reduced by apparatus which equalizes the conduction paths in the frequency converter.

This invention relates to the translation of electric wave frequency and, more particularly, to the doubling of such frequency.

An electric wave can be translated in frequency by nonlinear circuit effects. As a result, harmonic components of the wave are generated, one of which is selected as the frequency translated wave.

In the case of a frequency doubler, it is the second harmonic that is desired. The second harmonic is most readily generated using nonlinear circuit elements, such as diodes, which are arranged for push-pull operation.

With this arrangement one of the diodes conducts when the wave is positive going, while the other diode conducts when the wave is negative going. The resulting output contains a substantial second harmonic component.

However, unless the applied waveform is perfectly symmetric and the nonlinear circuit elements are perfectly balanced, the output will contain a component of the fundamental frequency as well. In addition, the second harmonic will be of lesser amplitude than would otherwise be the case.

Accordingly, it is an object of the invention to facilitate the translation of electric wave frequency.

A particular object is to facilitate the translation of an electric wave fundamental into a second harmonic.

A further object is to eliminate the requirement that the elements of a frequency translator be balanced in order to produce an efficient output.

A related object is to eliminate the need for precise balance in the case of a frequency doubler which is arranged for push-pull operation.

A still further object of the invention is to translate the fundamental frequency of an asymmetric waveform while at the same time minimizing any residue of the fundamental that accompanies the translated wave.

In accomplishing the foregoing and related objects, the invention provides for incorporating a storage device in common with nonlinear circuit devices that are variously responsive to the positive-going and negative-going portions of an applied waveform. As a result, the storage device stores energy in an amount proportional to the net difference in conduction of the nonlinear circuit devices. The effect is to equalize the conduction of the nonlinear devices and produce a balanced output.

In the case of the frequency doubler, the storage device is a capacitor in the common conduction path of two diodes. It is a feature of the invention that the storage device may be employed in conjunction with a balanced transformer or a bridge circuit.

Other features of the invention will become apparent after considering several illustrative embodiments of the invention taken in conjunction with the drawings, in which.

Figure 1:
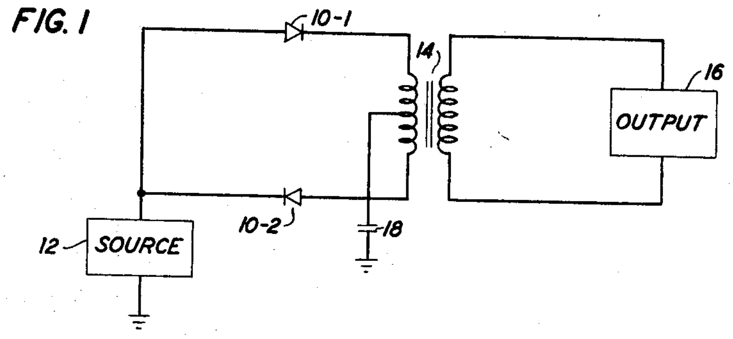
FIG. 1 is a frequency translator in accordance with the invention.

Turning to one embodiment of a frequency translator constructed in accordance with the invention, as shown in FIG. 1, two diodes 10–1 and 10–2 are connected in push-pull configuration with respect to an input source 12 and an output transformer 14. The source 12 is bipolar in producing a waveform with both positive-going and negative-going portions. For the embodiment of FIG. 1 the positive-going portions of the applied waveform of the source 12 are conducted by the upper diode 10–1 while the negative-going portions are conducted by the lower diode 10–2. As a result of the rectifying action of the two diodes 10–1 and 10–2 a wave with the desired frequency component appears at the secondary terminals of the transformer 14, and is applied to an output utilization circuit 16.

In the case of an alternating current signal applied from the source 12, for example, the output would approximate full wave rectification, with the output half cycles being dissimilar to the extent that the applied input is asymmetric and that the diodes 10–1 and 10–2 have unlike conduction characteristics. The existence of either condition would accentuate the appearance of unwanted harmonic components in the output, particularly of the fundamental.

The invention cures the foregoing situation in the embodiment of FIG. 1 by the connection of a capacitor 18 to a center tap point on the primary of the transformer 14. This places the capacitor 18 in the conduction path for both diodes 10–1 and 10–2 and, as a result, charges to a signal level which is proportioned to the net difference in the conduction of the two diodes.

The difference in conduction may arise because of differences in the characteristics of the two diodes or because of asymmetry in the applied wavefom. For illustration, the latter case is assumed as represented by the sinusoidal waveform *w* of FIG. 2A. If it were not for the capacitor 18 of FIG. 1 the output would take the pattern of the dashed-line waveform *d* of FIG. 2B—containing an appreciable undesired harmonic content. Instead, because of the capacitor 18, charge is stored in an amount proportional to the net difference on conduction of the two diodes. This produces the offset voltage *c* of FIG. 2A, across capacitor 18 and gives rise to the balanced waveform output *b* of FIG. 2B.

Figure 4:
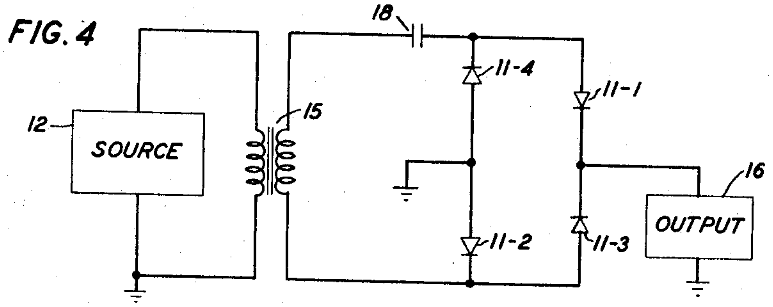
FIG. 4 is an alternative embodiment of the invention.

An alternative embodiment of the frequency translator of FIG. 1 is shown in FIG. 4 where two diodes 11–1 and 11–2 have been substituted for the nonlinear device 10–1 of FIG. 1 and two additional diodes 11–3 and 11–4 have been substituted for the nonlinear device 10–2. All four diodes 11–1 through 11–4 are disposed in a bridge rectifier configuration. As with the translator of FIG. 1, the capacitor 18 is connected in common with the nonlinear device represented by diodes 11–1 and 11–2 and the nonlinear device represented by diodes 11–3 and 11–4.

Figure 3:
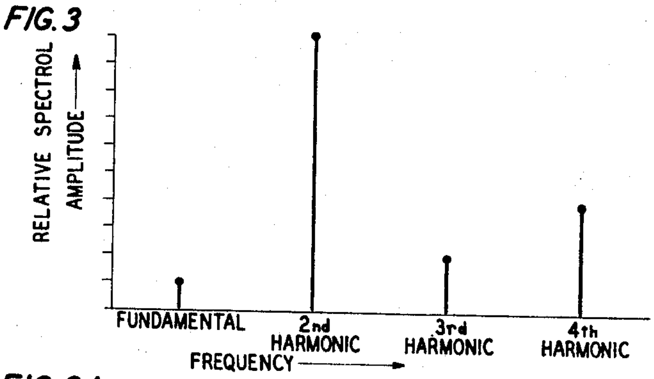
FIG. 3 is a representative graphical diagram of the spectral output of the frequency translator of FIG. 1.
Figures 2A, 2B:
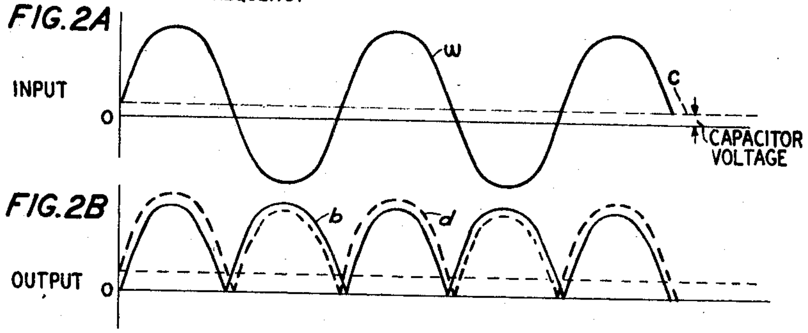
FIG. 2 is a waveform diagram for the translator of FIG. 1.

Conversely, if the diode conduction characteristics are unequal, the same kind of offset *c* of FIG. 2A will be produced. The resulting output, as shown in FIG. 2B, is substantially symmetrical even in the absence of imbalance elsewhere. The output has a representative spectral characteristic, as shown in FIG. 3, for which the amplitude of the desired second harmonic substantially exceeds that of the undesired harmonics, the fundamental in particular. Consequently, if it is desired to eliminate completely the effect of unwanted harmonics at the output, a low-pass filter (not shown) may be employed instead of one requiring a bandpass centered about the second harmonic. Since a bridge is employed in FIG. 4 the input is applied by way of an input transformer 15. In operation, the translator of FIG. 4 has characteristics similar to those previously described for FIG. 1.

Other modifications and adaptations of the invention will occur to those skilled in the art.

What is claimed is:

1. Apparatus comprising a source of positive-going and negative-going signals, a first nonlinear circuit device primarily conductive of the positive-going signals of said source, a second nonlinear circuit device primarily conductive of the negative-going signals of said source, and storage means differentially connected in common with said first nonlinear circuit device and said second nonlinear circuit device for equalizing the difference in conduction of the two devices.

2. Apparatus as defined in claim 1 wherein said first nonlinear circuit device is a first diode and said second nonlinear circuit device is a second diode, and said storage means is a capacitor.

3. Apparatus as defined in claim 2 further including a transformer having a primary winding with a center tap, said first diode and said second diode being connected in push-pull configuration with said transformer and said capacitor being connected to said center tap.

4. Apparatus as defined in claim 1 further including means for combining the outputs of said first nonlinear circuit device and said second nonlinear circuit device, said storage means being connected to the combining means for reducing the difference in the outputs thus combined.

5. Apparatus as defined in claim 1 wherein said first nonlinear circuit device comprises first and second diodes, said second nonlinear circuit device comprises third and fourth diodes, said diodes being disposed in a bridge circuit.

6. Apparatus as defined in claim 5 further including transformer means for applying said positive-going and negative-going signals, said storage means interconnecting said transformer means with said bridge circuit.

References Cited

UNITED STATES PATENTS

| | | | |
|---|---|---|---|
| 3,176,155 | 3/1965 | Stump | 307—88.5 |
| 3,244,987 | 4/1966 | Prapis et al. | 307—88.5 |
| 3,261,991 | 7/1966 | Lash | 307—88.5 |

JOHN S. HEYMAN, *Primary Examiner.*